(12) United States Patent
Costello et al.

(10) Patent No.: US 6,838,738 B1
(45) Date of Patent: Jan. 4, 2005

(54) ELECTROSTATIC CONTROL OF MICRO-OPTICAL COMPONENTS

(75) Inventors: Benedict J. Costello, Berkeley, CA (US); Peter T. Jones, Albany, CA (US); Ho-Shang Lee, El Sobrante, CA (US)

(73) Assignee: Dicon Fiberoptics, Inc., Richmond, CA (US)

( * ) Notice: Subject to any disclaimer, the term of this patent is extended or adjusted under 35 U.S.C. 154(b) by 0 days.

(21) Appl. No.: 10/081,496

(22) Filed: Feb. 20, 2002

Related U.S. Application Data

(60) Provisional application No. 60/324,245, filed on Sep. 21, 2001.

(51) Int. Cl.[7] .......................... H01L 27/14; H01L 29/82; H01L 29/84
(52) U.S. Cl. ...................................................... 257/414
(58) Field of Search ................... 257/414, 415, 257/416, 417, 418, 419, 420, 428, 429, 430, 421, 422; 250/306, 307, 308, 309, 310, 311, 315.3, 316.1, 580, 581; 359/872, 873, 874, 591, 592, 577, 587, 588

(56) References Cited

U.S. PATENT DOCUMENTS

| | | | | |
|---|---|---|---|---|
| 5,753,911 A | * | 5/1998 | Yasuda et al. | 250/306 |
| 5,969,848 A | * | 10/1999 | Lee et al. | 359/298 |
| 6,236,096 B1 | * | 5/2001 | Chang et al. | 257/419 |
| 6,428,173 B1 | * | 8/2002 | Dhuler et al. | 359/872 |
| 6,538,284 B1 | * | 3/2003 | Riccobene et al. | 257/347 |
| 6,539,137 B1 | * | 3/2003 | Moresco et al. | 385/14 |

* cited by examiner

*Primary Examiner*—Long Pham
*Assistant Examiner*—Dana Farahani
(74) *Attorney, Agent, or Firm*—Parsons Hsue & de Runtz LLP

(57) ABSTRACT

An electrostatic actuator with inter-digital rotor and stator fingers formed in a the insulating and conductive layers of a wafer. The actuator is used to drive MicroElectroMechanical (MEMS) components, specifically micro-optical components such as mirrors, attenuators, switches, and tunable filters.

50 Claims, 11 Drawing Sheets

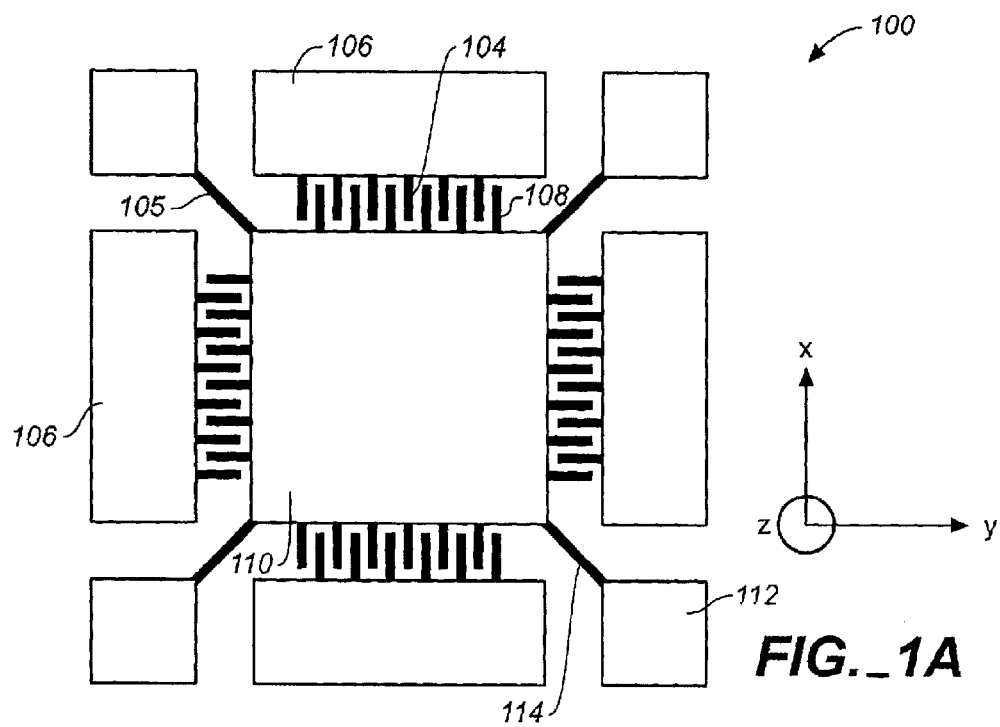
FIG._1A
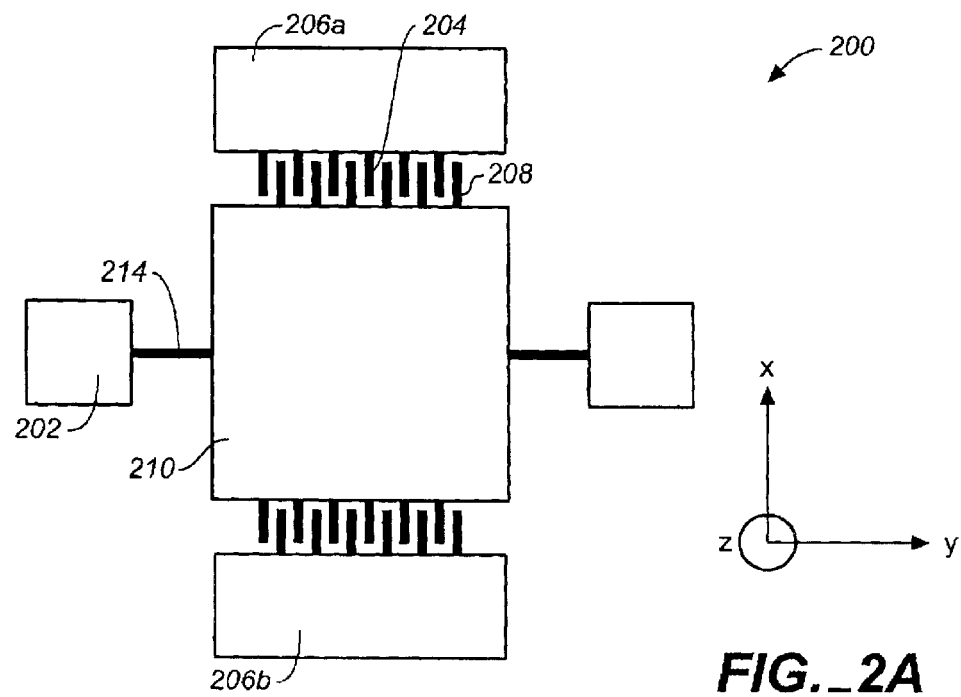
FIG._2A

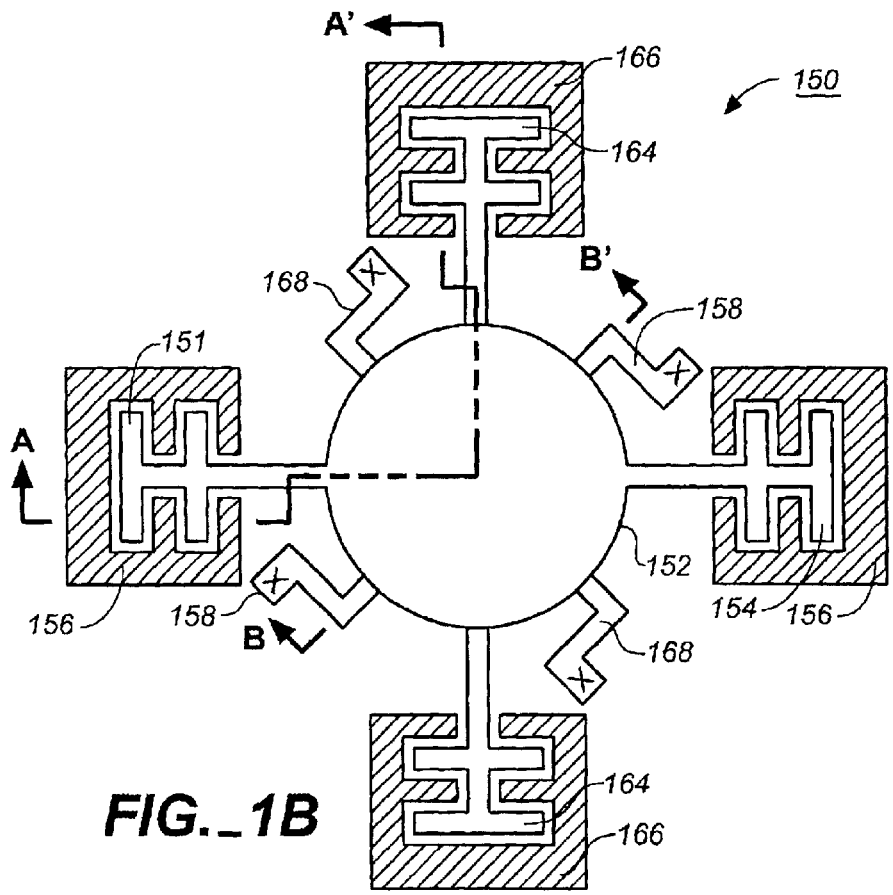
FIG._1B
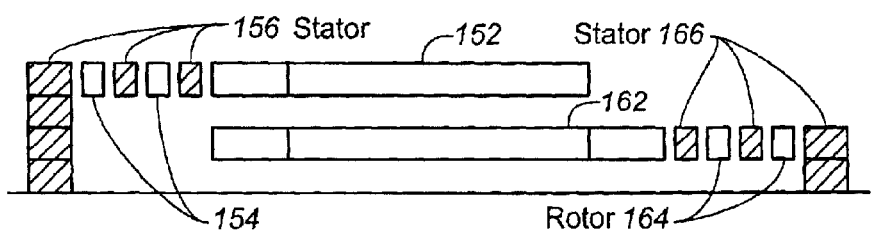
FIG._1C Section AA'
FIG._1D Section BB'

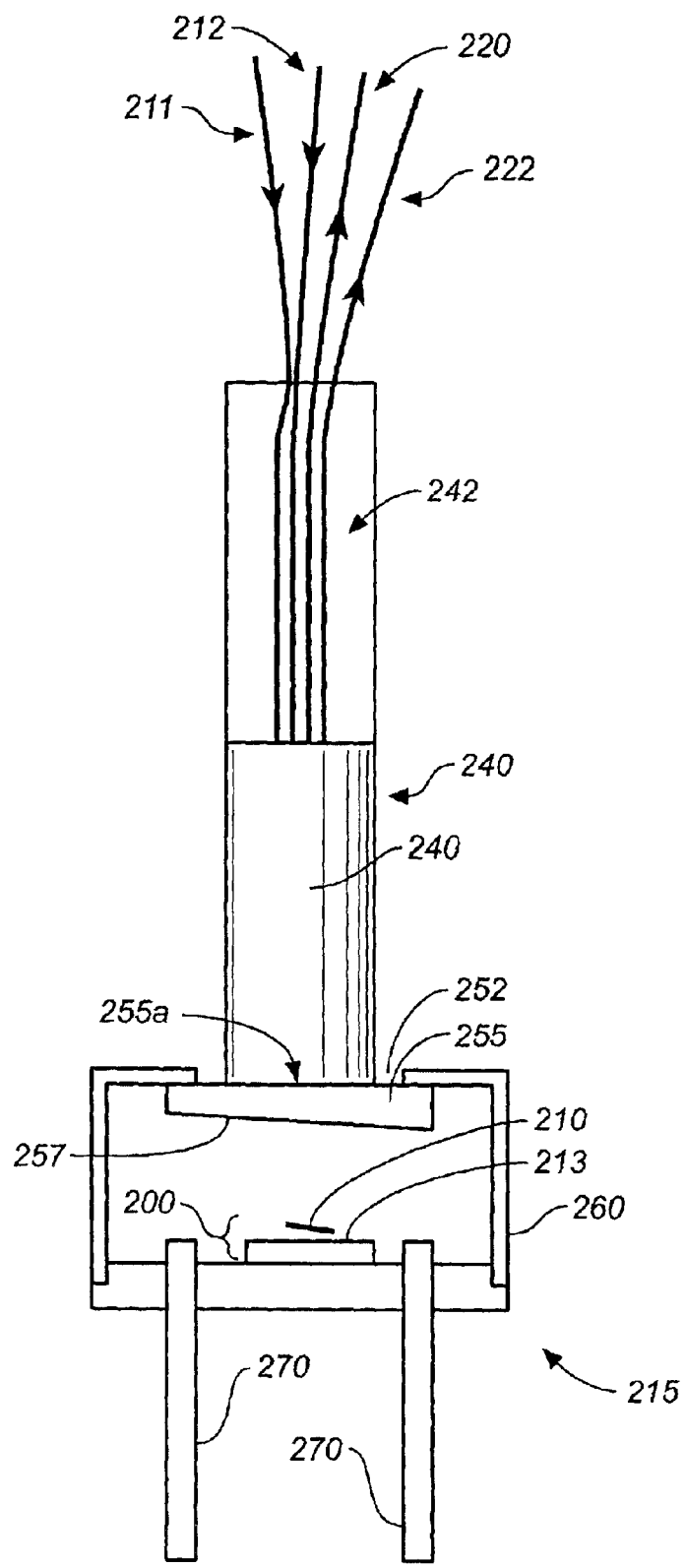
FIG._2B

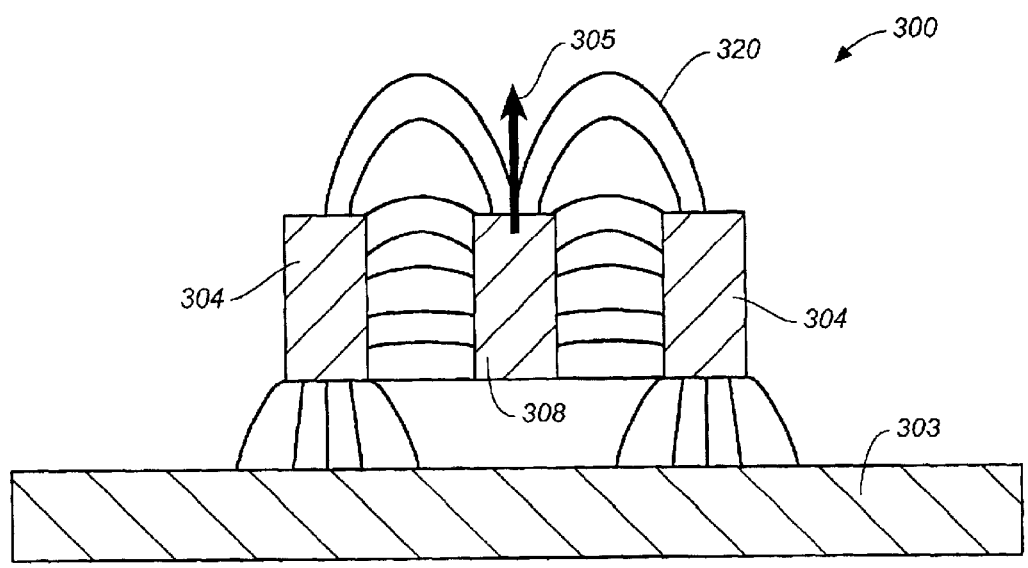
FIG._3
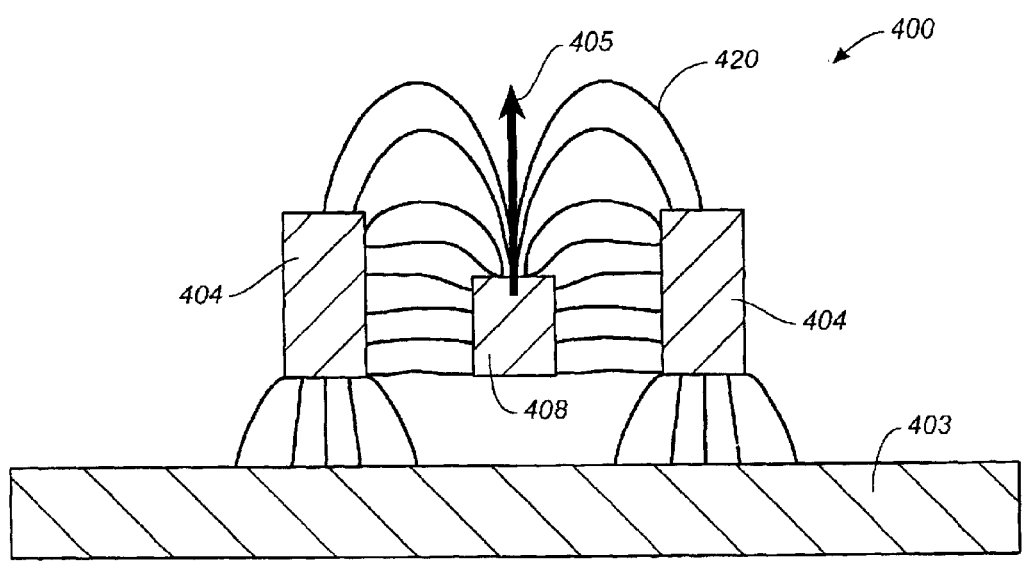
FIG._4

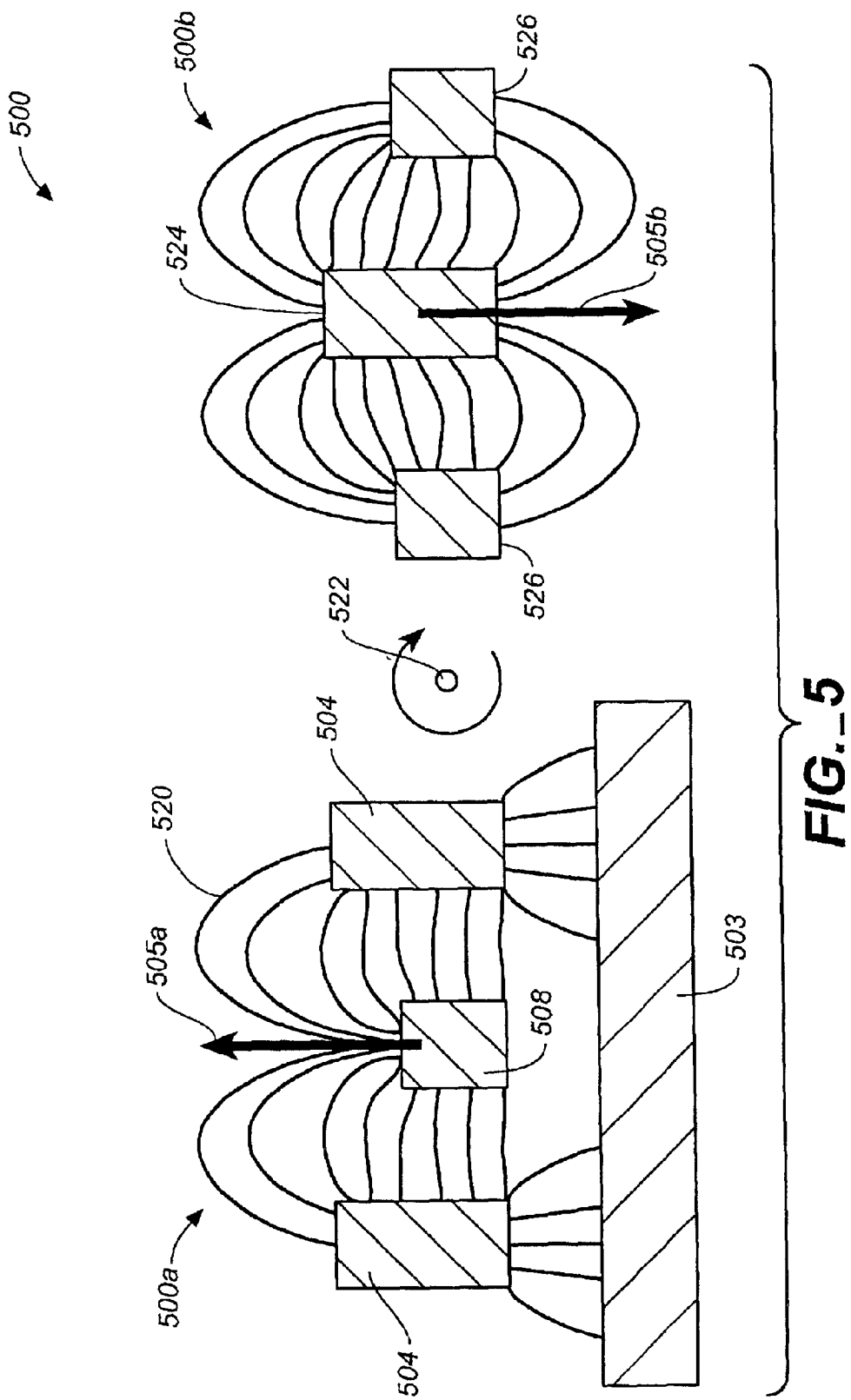
FIG._5

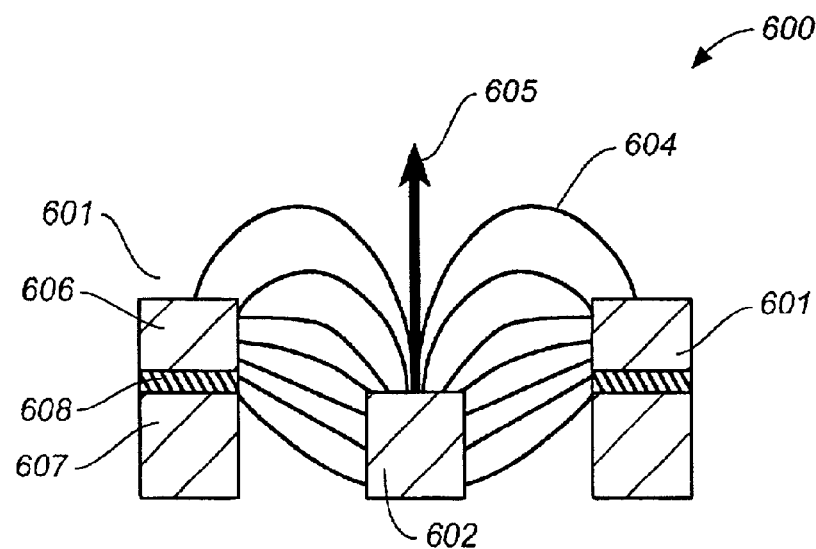
FIG._6
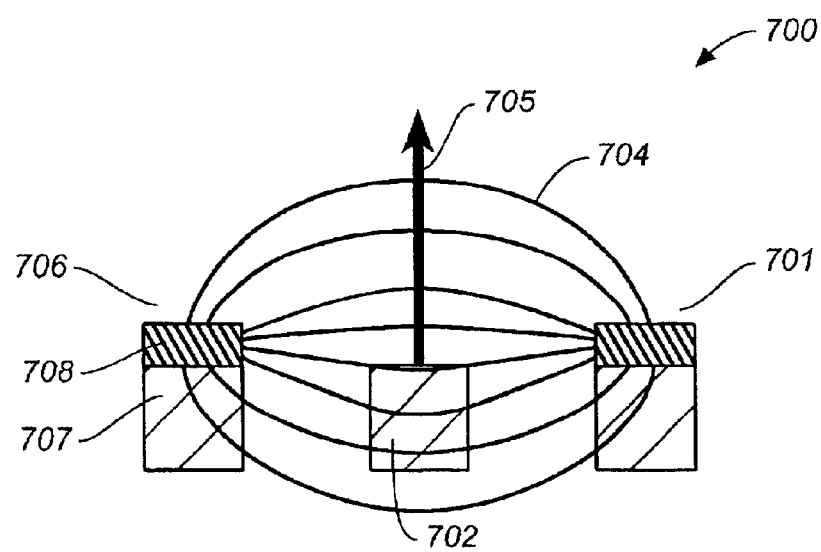
FIG._7

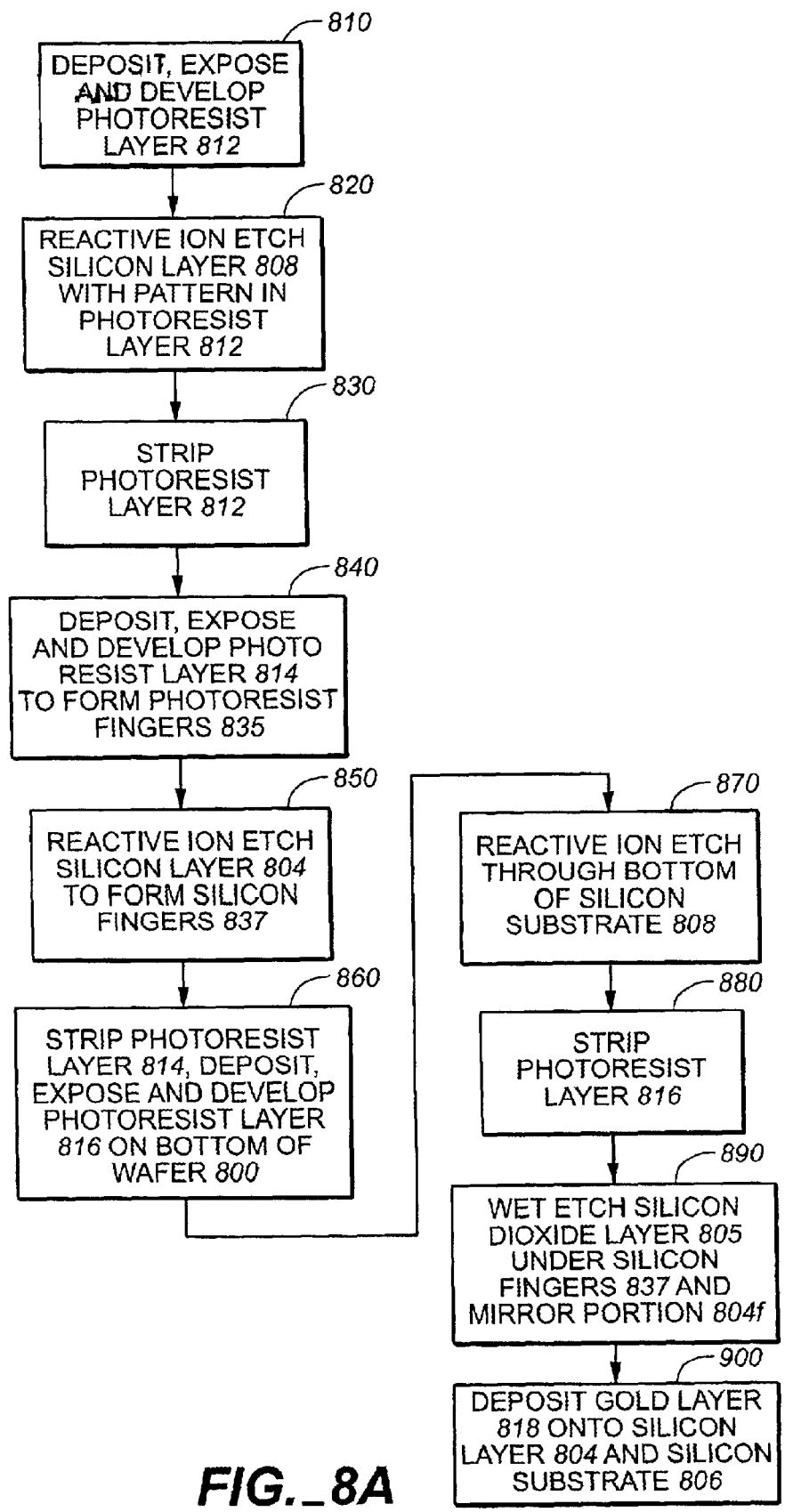
FIG._8A

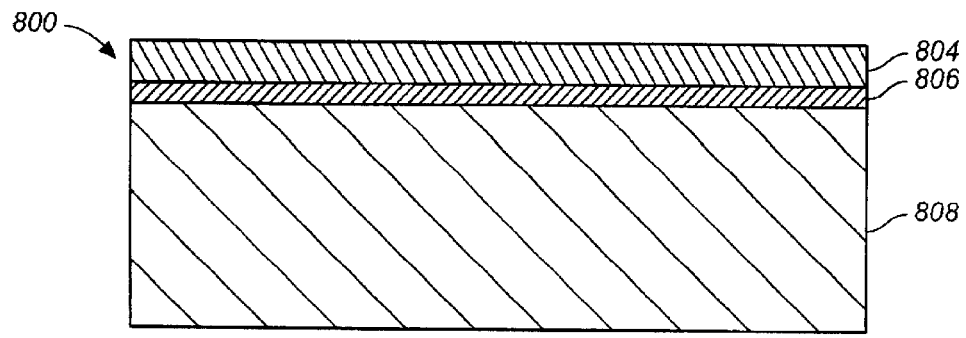
FIG._8B
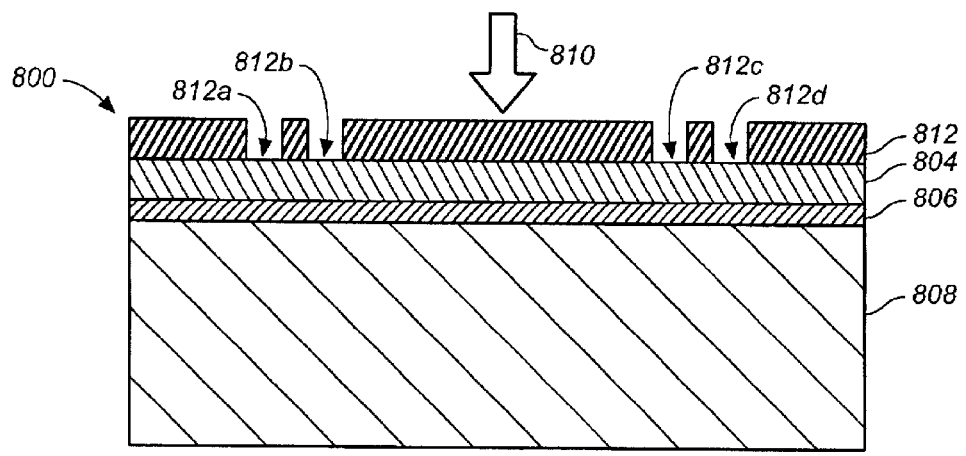
FIG._8C
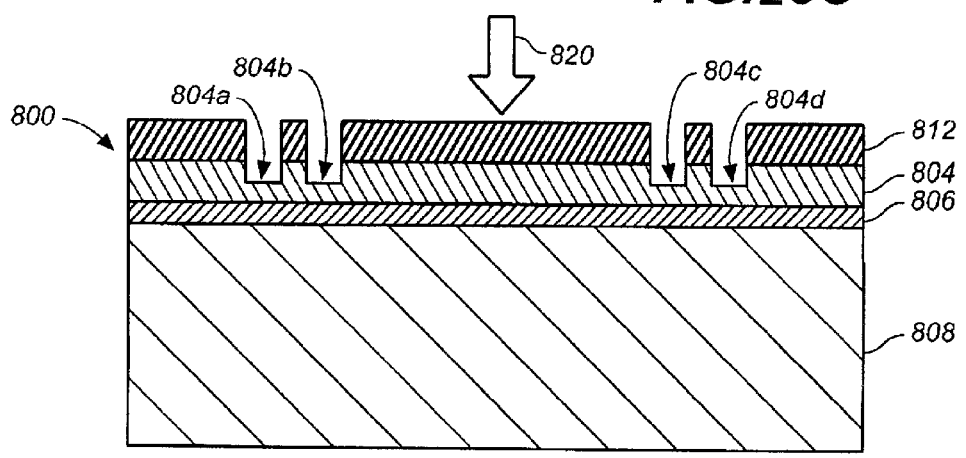
FIG._8D

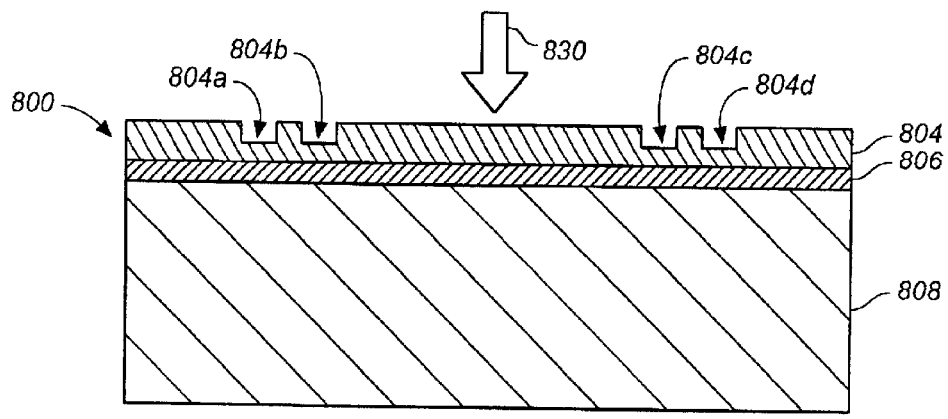
FIG._8E
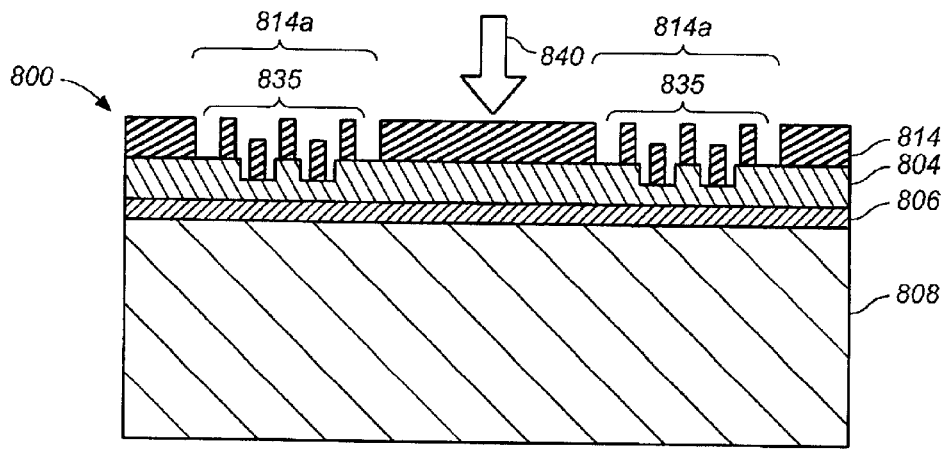
FIG._8F
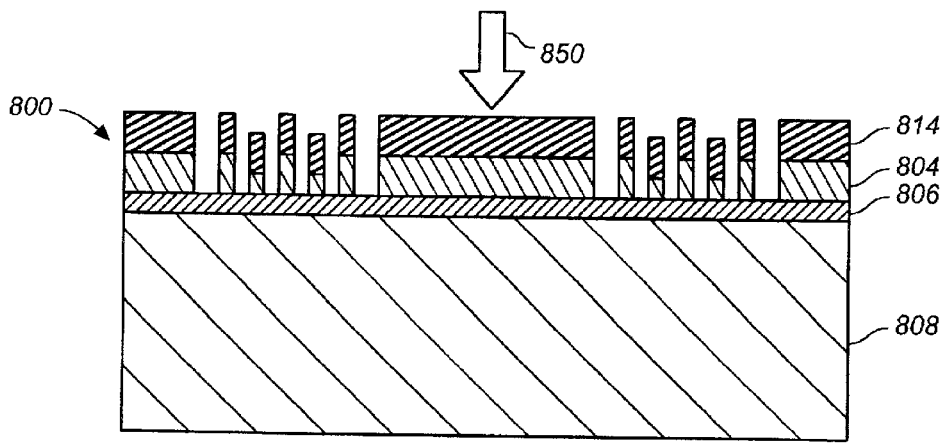
FIG._8G

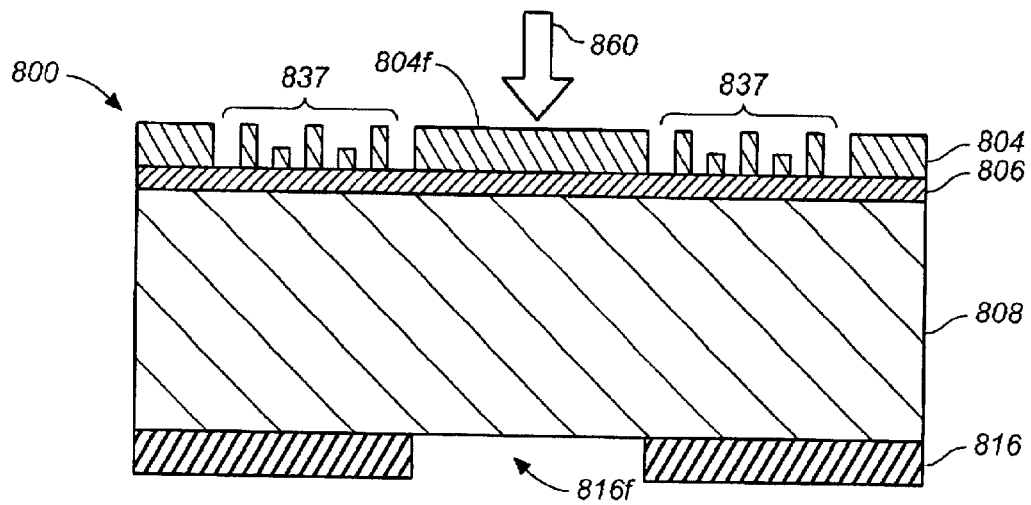
FIG._8H
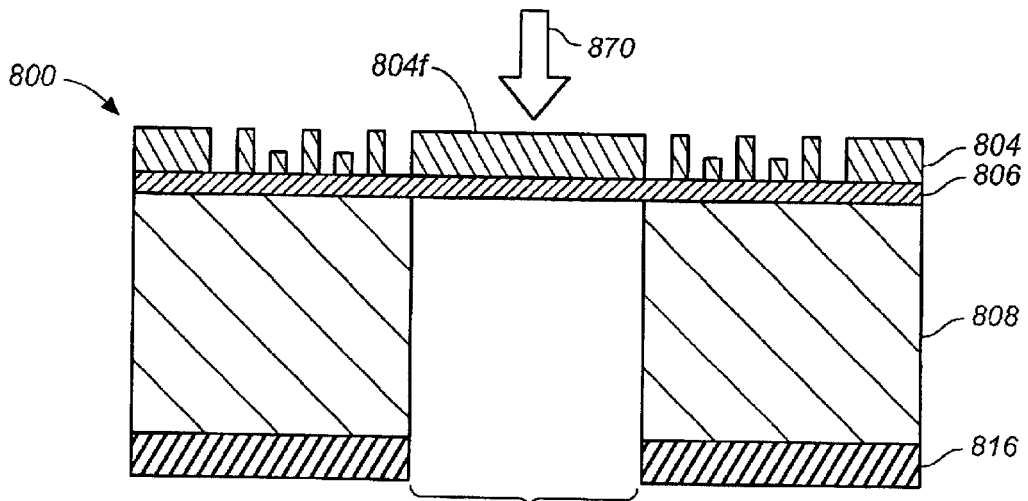
FIG._8I
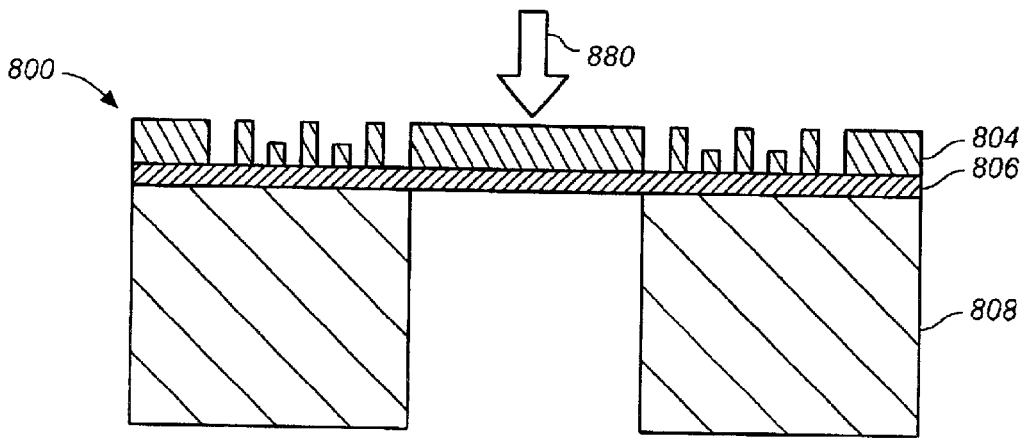
FIG._8J

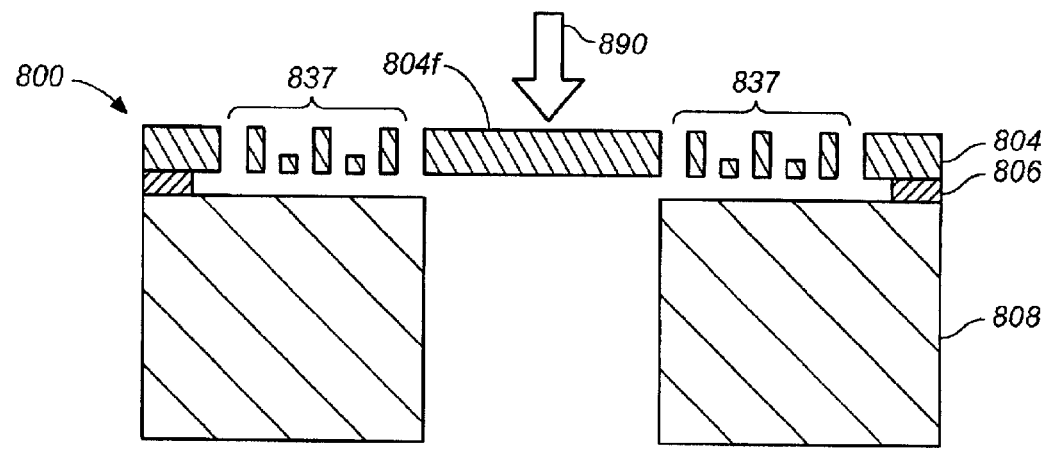
FIG._8K
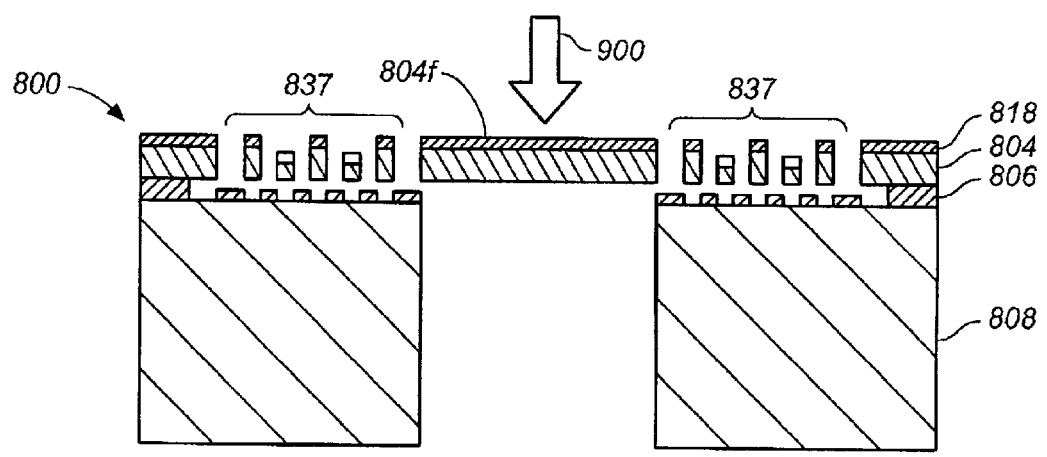
FIG._8L

ELECTROSTATIC CONTROL OF MICRO-OPTICAL COMPONENTS

CROSS REFERENCE TO RELATED APPLICATIONS

This application is related to U.S. patent application Ser. No. 09/941,411 entitled "Hybrid Opto-Mechanical Component" by David Polinsky and Benedict J. Costello filed on Aug. 28, 2001, and to U.S. patent application Ser. No. 09/671,377 entitled "Optical Switch" by Benedict J. Costello, Peter T. Jones and Ho-Shang Lee filed on Sep. 27, 2000, which are incorporated herein by this reference in their entirety. This application is also related to and claims priority from U.S. provisional Patent application No. 60/324,245 entitled "Electrostatic Control of Micro-Optical Components" by Benedict J. Costello, Peter T. Jones, and Ho-Shang Lee filed on Sep. 21, 2001, which is incorporated herein by this reference in its entirety.

BACKGROUND OF THE INVENTION

1. Field of the Invention

The present invention relates generally to micro-optical devices and more specifically to MicroElectroMechanical (MEMS) actuators and devices.

2. Related Art

Microfabricated fiberoptic switches and tunable filters require that an optical element such as a mirror, a lens, or a prism, move in response to an electric stimulus. In the prior art this has generally been accomplished by taking advantage of the electrostatic attraction between two parallel electrodes. Parallel plate electrostatic actuators have several disadvantages. They require high voltage, have a limited range of motion, and become unstable when moved beyond a critical point. Other actuators, such as electromagnetic or thermal actuators, overcome these limitations but at the cost of high power dissipation, slow response, and/or increased complexity of manufacture.

SUMMARY OF THE INVENTION

Vertical comb drive actuators combine advantages of very low power consumption, simple fabrication, fast speed, stable operation, and extended range of motion. Various configurations of the fingers or combs are shown to form various embodiments of the invention, which in turn are used in embodiments of micro-optical devices.

In one embodiment of the invention an electrostatic actuator formed in a single layer comprises a stator formed in the layer comprising a first plurality of fingers, and a rotor formed in the layer comprising a second plurality of fingers. One or more of the fingers of the second plurality is between the fingers of the first plurality, and one or more fingers of the stator and rotor are positioned above a conducting plane having the same potential as the rotor. Additionally, one or more fingers of the rotor has a height less than or equal to one or more fingers of the stator such that a vertical force is exerted upon the rotor.

In another embodiment of the invention a method of forming an electrostatic actuator in a wafer comprising a silicon substrate, an insulating layer on the substrate, and a silicon layer having a height x on an insulating layer, is disclosed. The method comprises etching a trench having a depth y within a silicon layer, and thereafter etching the silicon layer and the trench to the insulating layer to form a rotor finger of height x-y and a plurality of stator fingers of height x, and etching a portion of the insulating layer below the rotor and the stator fingers.

In yet another embodiment of the invention, an electrostatic actuator formed in a insulating layer is disclosed. In this embodiment, even an insulating rotor can be moved with electrostatic forces. The actuator comprises a stator comprising a first plurality of fingers having an insulating portion formed in the insulating layer, and a conductive portion upon the insulating portion. The actuator also includes a rotor comprising a second plurality of fingers, the rotor formed in the insulating layer, wherein one or more of the fingers of the second plurality is between the fingers of the first plurality. When a voltage is applied to the conductive portions of the stator fingers a vertical force is exerted upon one or more fingers of the rotor.

BRIEF DESCRIPTION OF THE DRAWINGS

FIG. 1A illustrates a plan view of an embodiment of a micro-optical component 100.

FIGS. 1B–1D illustrate micro-optical component 150, a tunable filter.

FIG. 2A illustrates a plan view of a rotating or pivoting micro-optical component 200.

FIG. 2B is a cross section of hybrid micro-optical component 215.

FIG. 3 is a cross section of an embodiment of an actuator for use in; a micro-optical component.

FIG. 4 is a cross section of another embodiment of an actuator for use in a micro-optical component.

FIG. 5 is a cross section of another embodiment illustrating a push-pull actuator for use in a micro-optical component.

FIG. 6 is a cross section of another embodiment of an actuator for use in a micro-optical component.

FIG. 7 is a cross section of another embodiment of an actuator for use in a micro-optical component.

FIG. 8a is a flowchart depicting the fabrication of an actuator for use in a micro-optical component.

FIGS. 8A–8L illustrate the steps of forming an actuator such as that of FIG. 3, 4 or 5.

DETAILED DESCRIPTION OF THE INVENTION

There are several variations on the vertical comb drive actuator that differ in their range of motion, fabrication complexity, and choice of starting material. They are related in that they all use the electrostatic force between a stationary element (stator) and a moving element (rotor). The force created and utilized in the vertical comb drive is perpendicular to the plane in which the rotor and stator are fabricated. To maximize the magnitude of this vertical force, the rotor and stator are generally patterned into the shape of an array of inter-digital fingers or combs.

For the purposes of this application, a stator is defined in its classic sense as the stationary part of the electrostatic actuator. The stator may be comprised of many different parts. Since the stator is formed in a layer of a wafer, the stator may include many fixed areas of the wafer, and any material on the wafer. The rotor is the moving part or parts of the wafer and any material such as an electric insulator or conductor on those part(s) of the wafer.

The height of the fingers of the rotor and stator is the dimension of the finger along the Z axis. A vertical force is a force in the positive or negative Z direction, i.e., away from or towards the bottom of the substrate or conducting plane. Likewise, vertical movement is along the Z axis.

The present invention will now be described in detail with reference to the drawings, wherein like elements are referred to with like reference labels throughout.

FIG. 1A is a plan view of an embodiment of a vertically actuating micro-optical component 100. Referring to FIG. 1A, fingers 104 of stator 106 are inter-digital with fingers 108 of rotor 110. For clarity, only one of the fingers 104 and 108 are labeled in FIG. 1A. These fingers 104 and 108 are used to translate rotor 110 of micro-machined structure 100 in a direction normal to the plane in which it was fabricated.

In the plan view shown in FIG. 1A, the plane of the silicon from which the device is fabricated is the x-y plane (the plane of the paper) and the direction of the force and motion is along the z axis (normal to the paper). Rotor 110 is attached to anchors 112 in the silicon layer via springs 114. The anchors 112 are fixed, as is the stator 106, thus the anchors may be considered part of the stator 106, or simply part of the silicon layer. Springs 114 are preferably made of the same silicon layer as the stator 106 and rotor 110. Further detail of the electrostatic forces propelling rotor 10 in the z direction will be discussed with regard to FIGS. 3–7.

FIGS. 1B–1D illustrate another embodiment of a vertically actuating micro-optical component, tunable filter 150. FIG. 1B is a plan view, FIG. 1C is a cross section at section line AA', and FIG. 1D is a cross section at section line BB'. Tunable filter 150 has two or more movable filters 152 and 162, and one or more fixed filters (not shown). Between the movable filters 152 and 162, and between movable filter 162 and the fixed filters (not shown) are air cavities. The filter 150 is adjustable or "tunable" by moving the filters 152 and 162 vertically in order to allow differing frequencies wavelengths of light to pass through. The filters are multi-layer structures, and by altering the composition and number of the layers, of each filter the reflectivity of the filters can be varied for differing applications. Filter 152 is anchored to the substrate by springs 158 and vertically moved by the electrostatic force induced between rotor 154 and stator 156 when a potential is applied to stator 156. Filter 162, located below filter 152 is connected to the substrate by springs 168 and vertically moved by the electrostatic force induced between rotor 164 and stator 166. The individual fingers of the rotor and stator and the electrostatic force between them will be described in further detail with regard to FIGS. 3–7.

FIG. 2A illustrates a plan view of an embodiment of a vertically actuating, rotating micro-optical component 200. Referring to FIG. 2A, fingers 204 of stator 206a and 206b are interdigitated with fingers 208 of rotor 210. For clarity, only one of the fingers 204 and 208 are labeled in FIG. 2. These fingers 204 and 208 are used to rotate or pivot rotor 210 about an axis aligned with springs 214. Rotor 210 will rotate about the axis when opposing forces are created at stator 206a and 206b. If a force in the positive z direction at one stator and a force is created in the negative z direction is created at the other stator, rotor 210 will rotate about the axis aligned with springs 214. Springs 214 are preferably made of the same silicon layer as the stator 206 and rotor 210. Springs 214 are simply narrow pieces of silicon that allow torsional rotation of the springs themselves and the rotor 210. Further detail of the electrostatic forces propelling rotor 200 about the axis will be discussed with regard to FIGS. 3–7.

Another example of such an optical component is a optical hybrid switch/attenuator/wavelength division multiplexer (WDM) shown in FIG. 2B. Micro-optical component 200 of FIG. 2A forms the base actuator component of the optical hybrid.

The optical hybrid according to the present invention employs a reflective surface which includes a microfabricated mirror to direct light or other forms of electromagnetic radiation (referred to collectively below as "light") from one or more input optical fibers to one or more output optical fibers. When the present invention functions as an optical switch, the mirror is tilted by an electronic control signal to redirect the light beam to alternate output fibers. When the present invention functions as an optical attenuator, the mirror is tilted to redirect the light beam gradually away from an output fiber, thus attenuating the output signal power. Similar functions can be achieved by tilting a narrow band pass, broad band pass or tap filter element in the device.

The optical switch/WDM hybrid and the optical attenuator/WDM hybrid embodiments preferably include a thin film filter element which reflects a portion of the incoming light from one or more input optical fibers to one or more output optical fibers. The remaining portion of the light from one or more input optical fibers is then transmitted through the filter onto a microfabricated mirror which is used to direct light either onto the same input fiber or onto an output fiber. The filter element may be a band pass or broad band filter element.

In the case where the actuator of the microfabricated mirror or filter is driven in such a way that all of the light is intended to be fully coupled into an output fiber, the optical component acts as a hybrid between a WDM and an optical switch.

In the case where the actuator of the of the microfabricated mirror or filter is driven in such a way that that the amount of light which is directed onto the, output fiber can be continuously adjusted, the optical components acts as a hybrid between a WDM and an optical attenuator.

FIG. 2B illustrates a cross-section view of an embodiment of an optical switch/WDM hybrid or an optical attenuator/WDM hybrid 215 as described below. The optical switch/WDM or attenuator/WDM 210 includes input optical fiber 211 and 212, output optical fibers 220 and 222, a lens 240, a thin film filter element 255 and a mirror 210. Mirror 210 is the rotor 210 seen in FIG. 2A with a reflective coating upon it. In an application where the rotor 210 functions as or drives a mirror, micro-optical component 200 of FIG. 2A is referred to as mirror chip 200. The mirror chip 200 also includes the circuitry necessary to rotate the mirror in response to an input signal. The input optical fibers 211 and 212 send one or more light beams from an external device coupled to the switch/WDM or attenuator/WDM. The light is coupled through the lens and a portion of the light will be reflected from the thin film filter onto the output fibers 220 and 222. The portion of the light which is not reflected by the thin film filter will be transmitted through the filter and impinge on the surface of the mirror. Depending on the position of the mirror the impinging light will be fully or partially directed back onto one input fiber or one output fiber.

A ferrule 242 supports the input optical fibers 211 and 212 and the output fibers 220 and 222 relative to one another, and relative to lens 240. The ferrule is made of glass or ceramic. The ferrule 242 supports the input optical fibers 211 and 212, and the output optical fiber 220 and 222 in a predetermined pattern.

A package 260 encases the mirror chip 200 in order to prevent dirt, moisture or corrosion from impairing its operation. The package 260 has an opening 252 through which the light beam passes. This opening can be sealed in order to prevent dirt or moisture from impairing the operation of the mirror either using the thin film filter 255, the outer diameter of the lens 240, or a glass window which is not shown in FIG. 2B.

The thin film filter element 255 is made of a transparent material, such as glass. The thin film filter element 255 can be coated on both sides. The filter element 255 preferably has an anti-reflective coating 257 on the side facing the mirror chip 200. The side 255a of the filter element 255 can either be coated with a narrow bandpass filter, which transmits the light in a certain portion of the wavelength spectrum, and reflects the remaining portion of the light outside this narrow band spectrum or it can be a broadband tap which transmits a portion of the power with the same percentage at all wavelengths and reflects the remaining portion. The filter element 255 preferably has a wedged cross-section, as shown in FIG. 2B in order to prevent an etalon caused by the two faces of the filter element 255. The package 260 is preferably a TO-type package, which is a cylindrical metal can with the parallel leads 270 extending from the bottom surface of the package 260.

One end of the lens 240 is attached to the ends of the co-terminus input and output optical fibers 211, 212, 220 and 222. Another end of the lens 240 is attached to the coated surface 255a of the filter element 255. The lens will be flush with the inside wall of the package 260, if the filter element 255 is used to seal the package 260. Or it may be inserted into the package 260 in which case the package 260 will be sealed to the outer wall of the lens 240.

The light beam travels in one or more of the input optical fibers 211 and 212, and is collimated by the lens 240. A portion of the optical signal is reflected off of the reflective optical coating 255a, is focused back through the lens 240 and is coupled to one of the output fibers 220 and 222. The remaining portion of the optical signal is transmitted through the filter element 255 and reflects off the mirror 210. The light which reflects off the mirror is transmitted through the filter element 255 and focused by the lens 240 onto one of the output fibers 220 and 222. If the mirror 210 is moved by the actuator in such a way that all of the light which reflects off the mirror 210 is coupled onto one of the output fibers 220 and 222, where the chosen output fiber depends on the drive voltage to the electrical leads 270, then the component acts as a hybrid between a WDM and an optical switch. If the mirror 210 is moved by the actuator in such a way that either all or a portion of the light which reflects off the mirror 210 is coupled onto just one of the output fibers 220 and 222, where the amount of light which is coupled is continuously adjustable depending on the drive voltage to the electrical leads 270, then the component acts as a hybrid between a WDM and a optical attenuator.

The lens 240 is preferably a GRIN (gradient index lens), and is sandwiched by the ferrule 242, and the coating 255a of the filter element 255.

In another embodiment, the mirror 210 may be partially transmissive, in which case a portion of the light which impinges on the surface of the mirror is reflected back onto one of the output fibers and the remaining portion is transmitted through the mirror. (The partially transmissive character of the mirror could be the result of one or more holes being placed in the mirror or it could be the result of using a thin film coating on the mirror surface.) In this embodiment the substrate 213 is a photodiode or, has a photodiode mounted to it as described below which converts the incident optical signal back to an electrical signal. By this method it is possible to tap a portion of the incoming signal for the purposes of monitoring the power level in one or more channels as well as analyzing the optical signal data.

For Further information on this hybrid component please see U.S. patent application Ser. No. 09/941,411 entitled "Hybrid Opto-Mechanical Component" by David Polinsky and Benedict J. Costello filed on Aug. 28, 2001, which was previou sly incorporated by reference in its entirety.

FIGS. 1A through 2B are illustrations of components that can utilize electrostatic actuators depicted in FIGS. 3–7. Many configurations of the springs, rotors and stators are possible in order to form other components or variations. These components include fiber optic switches, attenuators, and tunable filters that require an optical element such as a mirror, a lens, or a prism to move in response to an electric stimulus. The component is attached to or driven by the movement of the rotor.

FIG. 3 illustrates actuator 300, another embodiment of the invention. Actuator 300 may drive many different types of micro-optical components. The simplest vertical comb drive actuator consists of alternating conductive rotor fingers 308 (only one shown) and stator fingers 304 (only two shown) positioned above a conducting plane 303. When a voltage is applied to the stator and its fingers 304 relative to the rotor and its fingers 308 and conducting plane 303, an electrical field 320 is established between adjacent rotor fingers and stator fingers and between the stator and the conducting plane. No electric field exists between the rotor 308 and the conducting plane 303 because they are at the same potential. This imbalance or asymmetry in the electric field gives rise to a force 305 on the rotors in a direction normal to and away from the conducting plane 303. The force is proportional to the square of the applied voltage. Rotor 308 and stator 304 are about 20 microns high in this example, but can be anywhere from about 2–50 microns high. Conducting plane 303 is about 500–600 microns high.

The actuation force is maximum when the rotor 308 is closest to the conducting plane 303 and decreases to zero as the rotor 308 moves away from the conducting plane 303. As an example, for a typical geometry of rotors and stators that are 2 microns tall and 2 microns wide, separated from each other and from the conducting plane by 2 microns, the levitation force will drop to zero when the rotor has moved about 1 micrometer away from the conducting plane. This represents an equilibrium position and the rotor will remain in this position no matter how large the applied voltage is.

FIG. 4 illustrates actuator 400, an embodiment of the invention. Actuator 400 may drive many different types of micro-optical components.

The force 405 and range of motion of the levitation comb drive can be increased by reducing the height of the rotor 408 relative to the height of the stator 404. The electrical field 420 produces a larger electrostatic force 405 that will move the smaller rotor 408 a greater distance compared to rotor 308 of actuator 300.

The process of fabricating actuator 400 is relatively complex. Both rotors 408 and stators 404 are fabricated from the same silicon layer or substrate, as is conducting plane 403. Thus multiple masking and etching operations must be performed to create a lower profile rotor 408 than stator 404, with both the rotor and stator not in contact with the conducting plane 403. The process of fabricating actuator 400 from one silicon layer of a wafer will be described later with regards to FIGS. 8A–8L. The same or similar process can be used to form other actuators from a single wafer, including actuator 500.

FIG. 5 illustrates actuator 500, another embodiment of the invention. Actuator 500 may drive many different types of micro-optical components. Actuator 500 comprises two or more actuating sides, upside 500a and downside 500b on opposite sides of an axis of rotation 522.

If the height of the stator fingers 526 is reduced relative to the rotor fingers 524, the upward force is reduced. If additionally, the conducting plane 503 is removed from below the actuator 500b, the force 505b will be downward. This can be used to rotate a microfabricated structure by placing rotors 508 and 524 on opposing sides of the axis of rotation 522 then reducing the thickness of the rotors 508 of actuator 500 on one side of the axis of rotation (the up side 500a), and the stators 526 of actuator 500 on the opposite side (the down side 500b). When a voltage is applied to the stators 504 and 526 of such a device, the up side rotor 508 will experience an upward force 505a while the down side rotor 524 will experience a downward force 505b, resulting in a net rotation of the device about the axis of rotation 522. A shaft can be placed along axis 52 in order to rotate an optical component mounted directly on the shaft or connected to the shaft.

FIG. 6 illustrates actuator 600, another embodiment of the invention. Actuator 600 is a two-level vertical comb drive and may drive many different types of micro-optical components.

A much larger force and range of motion can be realized if the rotor and stator are vertically displaced from each other in their rest positions. Actuator 600 is shown in the rest position. One way to accomplish this is to fabricate the rotor and stator out of different layers of material. As mentioned previously, these layers may be part of a single wafer. Referring to FIG. 6, the micro-fabricated structure is formed from a composite of two conductive layers 606 and 607 separated by an insulator 608. Insulator 608, as well as all of the insulating layers described in this application is preferably silicon dioxide, but could be any electrical insulator such as silicon nitride, tantalum pentoxide, or even an organic material such as parylene or epoxy.

The stator fingers 601 are constructed from the top conductor 606, bottom conductor 607, and insulator 608. Rotor 602 is formed in the bottom conductive layer 607. When a voltage is applied to the stator 601, the resulting electrostatic force 605 will move the rotor 602 until it is co-planar with the plane of layer 606. Insulator 608 is about 1–2 microns thick and conductors 606 and 607 are about 10–20 microns thick.

FIG. 7 illustrates actuator 700, another embodiment of the invention. Actuator 700 may drive many different types of micro-optical components.

A vertical comb drive can also be formed by applying a voltage to alternate stator fingers to move even an insulative rotor. The resulting electric field 704 will exert a force 705 on the intervening rotor 702 toward the region of greatest electric field. A unique aspect of significant interest, this force will be exerted on the rotor whether the rotor is constructed from a conductive or insulating material.

So for instance, the rotor fingers 702 and stator fingers 701 and 706 are fabricated from an insulating structural material that, in the stator fingers 701 and 706, is covered with a conductive film 708. When a voltage is applied between alternate stator fingers, the electric field will be maximum in the plane of the conductive film 708. Since this plane is above the plane of rotor 702, the electrostatic force 705 will tend to move the rotor 702 upward until it is centered in the plane of the conductor 708. The magnitude of the field is proportional to the dielectric constant of the rotor material.

Fabrication

FIGS. 8A–8E illustrate the fabrication of the actuators described above using a silicon wafer, specifically the fabrication of actuator 400, a portion of which is shown in FIG. 4.

FIG. 8A is a flowchart that generally describes the process of manufacturing the actuators described above as is illustrated in illustrations 8b–8l. The flowchart should be viewed in tandem with FIGS. 8B–8L.

Referring to FIG. 8B, wafer 800 has an insulating layer 806 sandwiched between silicon layer 804 and silicon substrate 808. Insulating layer 806 is preferably silicon dioxide, but can be any insulating material such as silicon nitride, tantalum pentoxide, or even an organic material such as parylene or epoxy. Wafer 800 can be made in this configuration from a silicon wafer by the user, or alternatively can be purchased as a silicon on insulator (SOI) wafer. Manufacturing the actuator from a single wafer has many advantages over manufacturing the actuator from multiple wafers. Prior actuators were made by forming the fingers or combs of the stator in a first wafer and the fingers of the rotor in a second wafer, a more expensive process with a higher risk of misalignment of the various parts of the actuator.

In step 810 photoresist layer 812 is deposited on silicon layer 804' of wafer 800. In step 810 photoresist layer 812 is also exposed and developed to form a pattern that includes gaps 812a–d, as shown in FIG. 8C. In step 820 a reactive ion etching process is performed to form trenches 804a–d. Note that trenches 804a–d only extend partway through silicon layer 804 as seen in FIG. 8D. In step 830, photoresist layer 812 is stripped from silicon layer 804 leaving trenches 804a–d formed in silicon layer 804.

In step 840, photoresist layer 814 is deposited on silicon layer 804 with gaps 814a within photoresist layer 814. It is then exposed and developed to form photoresist fingers 835 within gap 814a. Some of photoresist fingers 835 are within trenches 804a–d and some are on the surface of silicon layer 804. The photoresist fingers 835 in trenches 803a–d are narrower than the trenches such that a subsequent etch will deepen only part of trenches 804a–d.

Next, in step 850, silicon layer 804 is reactive ion etched away so as to etch away silicon layer 804 within gap 814a, as can be seen in FIG. 8G. This etch is completely through silicon layer 804. However, if additional rotor or stator heights are desired, intermediate etches to different depths can be performed between steps 840 and 850. Silicon layer 804 is completely removed within gap 814a wherever the photoresist fingers 835 are not located.

In step 860, photoresist layer 814 is stripped away thus leaving silicon fingers 837, as can be seen in FIG. 8H. Silicon fingers 837 are of a different height. The shorter of fingers 837 are formed from the area of silicon layer 804 under trenches 804a–d shown in FIG. 8E. These shorter fingers were directly under the photoresist fingers 835 formed within the trenches 804a–d. The taller of fingers 837 are the full height of silicon layer 804. Photoresist layer 816 is deposited onto silicon layer 808 on the bottom of wafer 800. If an intermediate etching step is performed between steps 840 and 850 to produce other trenches, fingers of various heights can be produced. Photoresist layer 816 is then exposed, and developed such that it has a gap 816f beneath central portion 804f of silicon layer 804 remaining after steps 810–860. Central portion 804f may correspond to rotor 110 of FIG. 1A, or rotor 210 of FIG. 2A, or more generally may form the rotor or shaft connected to the rotor of any number of different type of actuators used in any number of types of micro-optical components.

In step 870, wafer 808 is reactive ion etched to the underside of silicon dioxide layer 806, leaving a trench 808f within wafer 808, as can be seen in FIG. 8I.

In step 880, photoresist 816 is stripped from substrate 808, as can be seen in FIG. 8J.

Next, in step 890, the silicon dioxide is removed, in a wet etching process, from beneath silicon fingers 837 and mirror portion 804f. Thus, at this cross section of wafer 800, silicon fingers and mirror portion 804 are free standing and are not connected to the substrate 808.

Optionally, an additional step 900 may be performed in order to a form a mirror. In step 900 reflective layer 818 is deposited on the top of the exposed surfaces of wafer 800. Reflective layer 818 is preferably gold, although it may be any other highly reflective material. Thus, the gold layer is deposited upon silicon layer 804 including silicon fingers 837, and substrate 808, as can be seen in FIG. 8L.

While particular embodiments of the present invention and their advantages have been shown and described, it should be understood that various changes, substitutions, and alterations can be made therein without departing from the spirit and scope of the invention as defined by the appended claims. For example, many different goemetries of optical components may be driven by the inter-digital actuators described. Thus, the rotor may be anchored to the stator with different rotor/spring/stator (substrate) patterns or geometries, such as a maze type labyrinth. In general, the inter-digital actuators shown in FIGS. 3–7 may drive a wide array of components, not only those illustrated. Furthermore, different ways of etching the rotor, stator, and the fingers thereof, are also within the scope of the invention, which is only defined by the appended claims.

What is claimed is:

1. An electrostatic actuator formed in a single layer comprising:

a stator formed in the layer comprising a first plurality of fingers;

a rotor formed in the layer comprising a second plurality of fingers, wherein:

one or more of the fingers of the second plurality is between the fingers of the first plurality, and one or more fingers of the stator and rotor are positioned above a conducting plane having the same potential as the rotor, each of said stator and rotor comprising electrically conducting layers, and one or more fingers of the rotor has a height less than or equal to one or more fingers of the stator such that a vertical force is exerted upon the rotor, the height measured from the bottom of the finger to the top of the finger, wherein the first and second plurality of fingers are substantially in a plane when no voltage is applied to the actuator, such plane being transverse to direction of the vertical force, said rotor being pivoted about an axis, so that when a voltage is applied to a conducting layer of the stator, a vertical force is exerted upon one or more fingers of the rotor, causing the rotor to rotate about the axis, wherein the rotor further comprises a central portion, the central portion forming part of a micro-optical component that attenuates or switches an input signal be rotation of the central portion of the rotor.

2. The electrostatic actuator of claim 1 wherein the single layer is a single layer of a wafer, the single layer comprising a semiconducting material.

3. The electrostatic actuator of claim 1 wherein the single layer comprises a conductive material.

4. The electrostatic actuator of claim 1 wherein the single layer comprises an insulating material.

5. The electrostatic actuator of claim 1 wherein the micro-optical component has one or more filter elements, and wherein one or more of the second plurality of fingers moves one or more of the filter elements.

6. The electrostatic actuator of claim 1, wherein a positive vertical force is exerted upon one or more of the rotor fingers such that the rotor is vertically moved from the plane of the stator.

7. The electrostatic actuator of claim 1 wherein a positive vertical force is exerted upon one or more of the rotor fingers causing the central portion of the rotor to rotate about an axis.

8. The electrostatic actuator of claim 1, wherein a positive vertical force is exerted upon one or more of the rotor fingers and a negative vertical force is exerted upon one or more of the rotor fingers such that the central portion of the rotor is rotated about an axis.

9. The electrostatic actuator of claim 1 further comprising one or more springs formed in the layer, the springs connected to the central portion of the rotor.

10. The electrostatic actuator of claim 9, wherein the central portion of the rotor is rotated about an axis aligned with the springs.

11. The electrostatic actuator of claim 1, wherein the conductive plane is located below the fingers at a first side of the actuator, but not below the fingers at a second side of the actuator.

12. The electrostatic actuator of claim 11, wherein a positive force is created at the first side and a negative force is created at the second side.

13. The electrostatic actuator of claim 12, wherein the actuator pivots about an axis located between the first and second side of the actuator.

14. The electrostatic actuator of claim 1, wherein the layer comprises silicon, and the rotor and stator comprise silicon.

15. The electrostatic actuator of claim 14 further comprising an insulating layer below the silicon layer.

16. The electrostatic actuator of claim 15 wherein the fingers of the stator and rotor are formed within the silicon layer by etching the silicon layer and the insulating layer.

17. The electrostatic actuator of claim 15 wherein the insulating layer is silicon dioxide.

18. The electrostatic actuator of claim 15 further comprising a silicon layer below the insulating layer, and wherein the fingers of the stator further comprise the insulating layer sandwiched between the silicon layer above and below the insulating layer.

19. An electrostatic actuator formed in a wafer having a first conductive layer, a second conductive layer and an insulating layer between the first and second conductive layers, the actuator comprising:

a stator comprising a first plurality of fingers, the fingers comprising a top conductor formed in the first conductive layer, a bottom conductor formed in the second conductive layer, and an insulator formed in the insulating layer;

a rotor comprising a second plurality of fingers, the rotor formed in the second conductive layer, and wherein:

one or more of the fingers of the second plurality is between the fingers of the first plurality, and when a voltage is applied to the conductors of the stator a vertical force is exerted upon one or more fingers of the rotor.

20. The actuator of claim 19 wherein the second plurality of fingers is coplanar with the bottom conductor of the first plurality of fingers.

21. The actuator of claim 19 wherein the rotor further comprises a central portion that is moved by the vertical force.

22. The actuator of claim 21, wherein the central portion is rotated about an axis.

23. The actuator of claim 21, wherein the central portion is moved substantially vertically from the substrate.

24. The actuator of claim 19 wherein the force moves a filter element of a tunable filter.

25. The actuator of claim 19 wherein the force rotates a reflective element to direct an input beam.

26. An electrostatic actuator formed in a insulating layer, the actuator comprising:

a stator comprising a first plurality of fingers having an insulating portion formed in the insulating layer, and a conductive portion upon the insulating portion;

a rotor comprising a second plurality of fingers, the rotor formed in the insulating layer, and wherein:

one or more of the fingers of the second plurality is between the fingers of the first plurality, and when a voltage is applied to the conductive portions of the stator fingers a vertical force is excited upon one or more fingers of the rotor.

27. The electrostatic actuator of claim 26 wherein the insulating portion of the stator is coplanar with the rotor when the voltage is not applied to the stator.

28. The electrostatic actuator of claim 26 wherein when the voltage is applied the vertical force moves the rotor such that it is coplanar with the conductive portions.

29. The electrostatic actuator of claim 28, wherein the rotor movement pivots a micro-optical component connected to the rotor.

30. The electrostatic actuator of claim 29, wherein the rotor movement pivots a mirror.

31. The electrostatic actuator of claim 29, wherein the micro-optical component is a tunable filter.

32. An MEMS actuator comprising:

a stator having a plurality of fingers comprising an insulating material, and a conductive material upon the insulating material;

a rotor having a plurality of fingers consisting of an insulating material, and wherein:

the fingers of the rotor are inter-digital with the fingers of the stator, and the insulating material of the stator is coplanar with the insulating material of the rotor when no voltage is applied, and when a voltage is applied to the conductive material of the stator, a force is created moving the rotor upward towards the conductive material of the stator.

33. The MEMS actuator of claim 32, wherein the insulating material of the rotor and the stator are formed within the same layer of a wafer.

34. The MEMS actuator of claim 32, wherein the insulating material of the rotor and stator are formed from different wafers.

35. An electrostatic actuator comprising:

a stator comprising a first plurality of fingers;

a rotor comprising a second plurality of fingers, said rotor being pivoted about an axis, wherein:

one or more of the fingers of the second plurality is between the fingers of the first plurality, said first and second plurality of fingers being substantially in a common plane when no voltage is applied to the actuator, wherein one or more fingers of the stator and rotor positioned adjacent to a conducting plane having substantially the same electrical potential as the rotor, and one or more fingers of the rotor and one or more fingers of the stator having dimensions in a direction transverse to the common plane such that a first force along such direction is exerted upon the rotor when a voltage is applied to the stator causing the central portion of the rotor to rotate about the axis, wherein the rotor further comprises a central portions the central portion forming part of a micro-optical component that attenuates or switches an input signal by rotation of the central portion of the rotor.

36. The electrostatic actuator of claim 35, wherein the stator and rotor are formed from a single layer.

37. The electrostatic actuator of claim 35, the stator and rotor comprising a semiconducting, conductive or insulating material.

38. The electrostatic actuator of claim 35, wherein the micro-optical component has one or more filter elements, and wherein one or more of the second plurality of fingers moves one or more of the filter elements.

39. The electrostatic actuator of claim 35, the first force causing the central portion of the rotor to rotate about an axis.

40. The electrostatic actuator of claim 35, wherein the first force is exerted upon one or more of the rotor fingers and a second force along a direction opposite to the direction of the first force is exerted upon one or more of the rotor fingers such that the central portion of the rotor is rotated about an axis.

41. The electrostatic actuator of claim 35, further comprising one or more springs connected to the central portion of the rotor.

42. The electrostatic actuator of claim 41, wherein the central portion of the rotor is rotated about an axis aligned with the springs by the first force.

43. The electrostatic actuator of claim 35, wherein the first force causes the rotor to move out of the common plane.

44. The electrostatic actuator of claim 35, wherein the conductive plane is located below the fingers at a first side of the actuator, but not adjacent to the fingers at a second side of the actuator.

45. The electrostatic actuator of claim 44, wherein a positive force is created at the first side and a negative force is created at the second side.

46. The electrostatic actuator of claim 45, wherein the actuator pivots about an axis located between the first and second side of the actuator.

47. The electrostatic actuator of claim 35, said fingers comprising a silicon layer and an insulating layer.

48. The electrostatic actuator of claim 47 wherein the fingers of the stator and rotor are formed within the silicon layer by etching the silicon layer and the insulating layer.

49. The electrostatic actuator of claim 48 wherein the insulating layer comprises silicon dioxide.

50. The electrostatic actuator of claim 35, wherein the dimensions of one or more of the fingers of the rotor are less than or equal to those of one or more of the fingers of the stator.

* * * * *